United States Patent
Karthikeyan (10) Patent No.: US 8,965,837 B2
(45) Date of Patent: Feb. 24, 2015

(54) DATA COLLECTION FRAMEWORK

(75) Inventor: Sailatha Karthikeyan, Karnataka (IN)

(73) Assignee: Accenture Global Services Limited, Dublin (IE)

( * ) Notice: Subject to any disclaimer, the term of this patent is extended or adjusted under 35 U.S.C. 154(b) by 614 days.

(21) Appl. No.: 13/302,307

(22) Filed: Nov. 22, 2011

(65) Prior Publication Data

US 2012/0130941 A1    May 24, 2012

(30) Foreign Application Priority Data

Nov. 23, 2010    (IN) .............................. 3514/CHE/2010

(51) Int. Cl.
*G06F 17/30*    (2006.01)
*G06Q 10/00*    (2012.01)
*G06Q 30/00*    (2012.01)

(52) U.S. Cl.
CPC ................ *G06Q 10/00* (2013.01); *G06Q 30/00* (2013.01)
USPC ....................................................... 707/600

(58) Field of Classification Search
CPC ............................. G06Q 10/00; G06Q 30/00
USPC ....................................................... 707/600
See application file for complete search history.

(56) References Cited

U.S. PATENT DOCUMENTS

| | | | | |
|---|---|---|---|---|
| 5,710,887 A | * | 1/1998 | Chelliah et al. | 705/26.62 |
| 6,128,624 A | * | 10/2000 | Papierniak et al. | 1/1 |
| 7,299,255 B2 | * | 11/2007 | Tenorio | 709/201 |
| 7,818,206 B2 | * | 10/2010 | Smith et al. | 705/14.1 |
| 8,055,548 B2 | * | 11/2011 | Staib et al. | 705/26.1 |
| 8,392,298 B2 | * | 3/2013 | Kumar et al. | 705/30 |
| 8,473,399 B2 | * | 6/2013 | Catahan et al. | 705/37 |
| 2004/0122943 A1 | * | 6/2004 | Error et al. | 709/224 |
| 2007/0265944 A1 | * | 11/2007 | Catahan et al. | 705/30 |
| 2007/0299743 A1 | * | 12/2007 | Staib et al. | 705/27 |

* cited by examiner

*Primary Examiner* — Sheree Brown
(74) *Attorney, Agent, or Firm* — Fish & Richardson P.C.

(57) ABSTRACT

A common data collection framework accesses data collected by an electronic commerce system in a format specific to the electronic commerce system. The common data collection framework determines a type of the data and identifies, from among multiple types of common data objects, a common data object that is independent of the electronic commerce system and that is defined to store data corresponding to the determined type. The common data collection framework stores the data collected by the electronic commerce system in an instance of the common data object and provides, to an analytics system, the instance of the common data object to enable the analytics system to perform analytics on the data collected by the electronic commerce system using the common format that is different than the format specific to the electronic commerce system and that accommodates multiple, different types of electronic commerce systems.

20 Claims, 6 Drawing Sheets

DATA COLLECTION FRAMEWORK

CROSS-REFERENCE TO RELATED APPLICATION(S)

The present application claims the benefit of Indian Patent Application No. 3514/CHE/2010, filed on Nov. 23, 2010, which is incorporated herein by reference in its entirety for all purposes.

FIELD

The present disclosure relates to data collection.

BACKGROUND

Electronic commerce websites enable users to buy and sell products and services using the Internet. Data associated with the use of such websites can be analyzed to provide businesses with information for making business decisions. Data analysis is sometimes performed by an analytics vendor under an arrangement between the vendor and an owner of an electronic commerce website.

SUMMARY

In one aspect, a computer system includes at least one processor and at least one memory coupled to the at least one processor having stored thereon instructions which, when executed by the at least one processor, causes the at least one processor to perform operations. The operations include accessing data collected by an electronic commerce system, where the data is arranged in a format specific to the electronic commerce system. The operations also include determining, from among multiple types of data collected by electronic commerce systems, a type of the data collected by the electronic commerce system in response to accessing the data collected by the electronic commerce system and, based on the determination of the type of the data collected by the electronic commerce system, identifying, from among multiple types of common data objects that are defined to store data corresponding to the multiple types of data collected by electronic commerce systems, a common data object that is independent of the electronic commerce system and that is defined to store data corresponding to the determined type of the data collected by the electronic commerce system. The common data object has a common format that is different than the format specific to the electronic commerce system and that accommodates multiple, different types of electronic commerce systems. The operations further include storing the data collected by the electronic commerce system in an instance of the common data object based on the identification of the common data object and, after storing the data collected by the electronic commerce system in the instance of the common data object, providing, to an analytics system, the instance of the common data object to enable the analytics system to perform analytics on the data collected by the electronic commerce system using the common format that is different than the format specific to the electronic commerce system and that accommodates multiple, different types of electronic commerce systems.

In another aspect, a computer-implemented method includes accessing data collected by an electronic commerce system, where the data is arranged in a format specific to the electronic commerce system. The method also includes determining, from among multiple types of data collected by electronic commerce systems, a type of the data collected by the electronic commerce system in response to accessing the data collected by the electronic commerce system and, based on the determination of the type of the data collected by the electronic commerce system, identifying, from among multiple types of common data objects that are defined to store data corresponding to the multiple types of data collected by electronic commerce systems, a common data object that is independent of the electronic commerce system and that is defined to store data corresponding to the determined type of the data collected by the electronic commerce system. The common data object has a common format that is different than the format specific to the electronic commerce system and that accommodates multiple, different types of electronic commerce systems. The method further includes storing the data collected by the electronic commerce system in an instance of the common data object based on the identification of the common data object and, after storing the data collected by the electronic commerce system in the instance of the common data object, providing, to an analytics system, the instance of the common data object to enable the analytics system to perform analytics on the data collected by the electronic commerce system using the common format that is different than the format specific to the electronic commerce system and that accommodates multiple, different types of electronic commerce systems.

In yet another aspect, at least one computer-readable storage medium is encoded with executable instructions that, when executed by at least one processor, cause the at least one processor to perform operations. The operations include accessing data collected by an electronic commerce system, where the data is arranged in a format specific to the electronic commerce system. The operations also include determining, from among multiple types of data collected by electronic commerce systems, a type of the data collected by the electronic commerce system in response to accessing the data collected by the electronic commerce system and, based on the determination of the type of the data collected by the electronic commerce system, identifying, from among multiple types of common data objects that are defined to store data corresponding to the multiple types of data collected by electronic commerce systems, a common data object that is independent of the electronic commerce system and that is defined to store data corresponding to the determined type of the data collected by the electronic commerce system. The common data object has a common format that is different than the format specific to the electronic commerce system and that accommodates multiple, different types of electronic commerce systems. The operations further include storing the data collected by the electronic commerce system in an instance of the common data object based on the identification of the common data object and, after storing the data collected by the electronic commerce system in the instance of the common data object, providing, to an analytics system, the instance of the common data object to enable the analytics system to perform analytics on the data collected by the electronic commerce system using the common format that is different than the format specific to the electronic commerce system and that accommodates multiple, different types of electronic commerce systems.

Implementations may include one or more of the following features. For example, the common data object may be independent of the analytics system. In addition, the operations may include controlling the electronic commerce system to collect the data. The operations also may include controlling the electronic commerce system to implement business logic needed to collect data stored by the common data object. The operations further may include controlling the analytics system to generate a report based on data provided using common data objects.

In some examples, the operations may include defining the common data object to include attributes that relate to building blocks of the electronic commerce system. In these examples, the operations may include defining the common data object to include attributes that relate to building blocks that are common to each of the multiple, different types of electronic commerce systems.

In some implementations, the operations may include defining the multiple types of common data objects to represent building blocks of the electronic commerce system. In these implementations, the operations may include defining the multiple types of common data objects to represent building blocks that are common to each of the multiple, different types of electronic commerce systems. Further, in these implementations, the operations may include defining a common order data object that stores data associated with orders, a common catalog data object that stores data associated with catalog entries, a common member data object that stores data associated with members, a common marketing data object that stores data associated with marketing items, a common trading data object that stores data associated with trades, and a common pricing data object that stores data associated with pricing.

In addition, the operations may include providing, to a new analytics system that is different than the analytics system, instances of the multiple types of common data objects to enable the new analytics system to perform analytics on the instances of the multiple types of common data objects without requiring change of code used by the electronic commerce system to collect data. The operations may include providing, to the analytics system, values for additional instances of the multiple types of common data objects to enable the analytics system to perform analytics on the instances of the multiple types of common data objects without requiring change of data collection logic used by the electronic commerce system. The operations further may include mapping attributes of the format specific to the electronic commerce system to attributes of the common data object.

In some examples, the operations may include using an analytics object factory class to create the multiple types of common data objects for the electronic commerce system. In these examples, the operations may include receiving user input of a type of the electronic commerce system and using the analytics object factory class to return an instance of a system specific object creator class for the type of the electronic commerce system.

Further, the operations may include using an analytics object creator to provide a generic interface which has methods to create generic analytics objects for each analytics event. The operations may include creating a class specific to a platform used by the electronic commerce system to create generic analytics objects. The operations also may include defining the multiple types of common data objects to represent a set of analytics object classes that include at least an analytics page view class, an analytics product view class, an analytics order class, and an analytics registration class.

The details of one or more implementations are set forth in the accompanying drawings and the description, below. Other potential features and advantages of the disclosure will be apparent from the description and drawings, and from the claims.

DETAILED DESCRIPTION

In some implementations, techniques for collecting and providing electronic commerce data are described. In general, such data may be collected from an electronic commerce system (e.g., ATG, IBM WebSphere Commerce, and the like) and may be provided to an analytics vendor (e.g., Omniture, Coremetrics, and the like). By implementing a common data collection framework independent of an electronic commerce system or an analytics vendor, for example, an owner of an electronic commerce website can change to another electronic commerce system or change to another analytics vendor without modifying website code or making other large-scale or costly changes to underlying system architecture.

Figure 1:
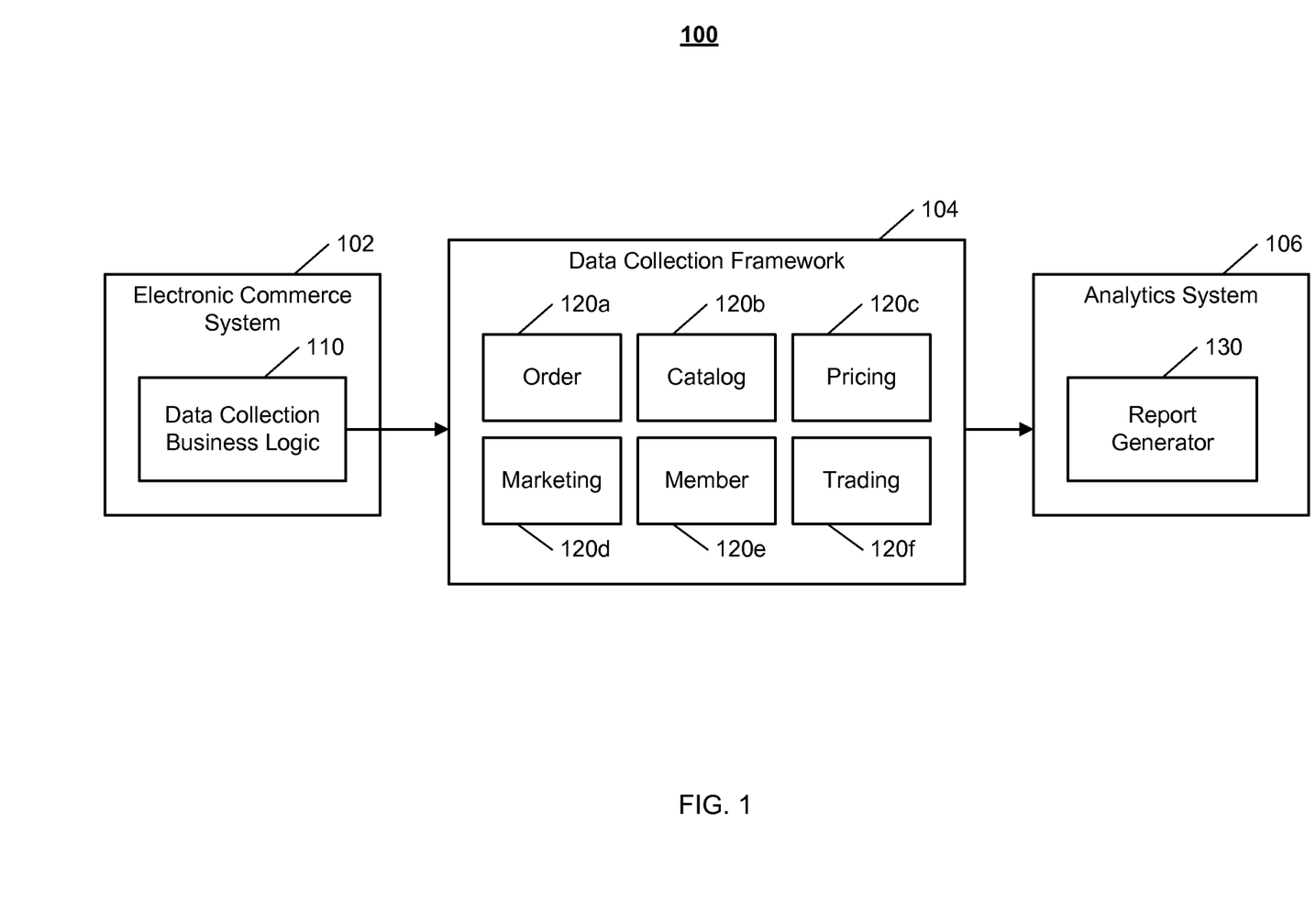
FIGS. 1, 2, 5, and 6 are diagrams of exemplary systems.

FIG. 1 illustrates an exemplary system 100 for collecting and providing electronic commerce data. The system 100 includes an electronic commerce system 102, a data collection framework 104, and an analytics system 106. In general, data collected by the electronic commerce system 102 may be provided to the data collection framework 104, the data collection framework 104 may store the data using various common data objects, and the data may be provided to the analytics system 106.

The electronic commerce system 102 may include data collection business logic 110. In general, the electronic commerce system 102 may also include various building blocks or components, including, for example, building blocks related to orders, catalogs, pricing, marketing, membership, trading, and the like. The data collection business logic 110 can access data associated with such building blocks, where the data is arranged in a format specific to the electronic commerce system 102. The electronic commerce system 102 may provide the data to the data collection framework 104 in the format specific to the electronic commerce system 102. For example, the electronic commerce system 102 may be used to implement an electronic commerce website which enables users to place orders for products or services, and the data collection business logic 110 may be configured to collect and provide order-related data to the data collection framework 104. The data collection business logic 110 may include application code for retrieving the order-related data from persistent storage, for example. As another example, the data collection business logic 110 may filter or intercept the order-related data as it is provided to the electronic commerce system 102 by users. In some implementations, the electronic commerce system 102 may be controlled to collect data. For example, the electronic commerce system 102 can be controlled by the data collection framework 104 to implement the data collection business logic 110 for collecting data stored by one or more common data objects.

The data collection framework 104 may include common data objects 120. For example, in response to accessing data collected by the electronic commerce system 102, the data collection framework 104 can determine from multiple types of data collected by various electronic commerce systems, a type of data collected by the electronic commerce system 102. Based on the type determination, for example, the data collection framework 104 can identify a common data object from among multiple types of common data objects 120 that are defined to store data corresponding to data collected by the electronic commerce system 102. For example, if the data collection framework 104 determines that data provided by the data collection business logic 110 is related to an order, the framework 104 can identify an order common data object 120a.

In some implementations, the common data objects 120 can be defined to represent building blocks of the electronic commerce system 102. In the illustrated example, the common order data object 120a may be defined to store data associated with orders, a common catalog data object 120b can be defined to store data associated with catalog entries, a common pricing data object 120c can be defined to store data associated with pricing, a common marketing data object 120d can be defined to store data associated with marketing items, a common member data object 120e can be defined to store data associated with members, and a common trading data object 120f can be defined to store data associated with trades. In some implementations, more or fewer common data objects 120 can be defined to represent building blocks of one or more electronic commerce systems.

In some implementations, the common data objects 120 can be defined to include attributes that relate to building blocks of the electronic commerce system 102. For example, the order common data object 120a can be defined to include attributes (e.g., orderId, storeName, orderTotal, and the like) that relate to order data captured by the electronic commerce system 102. The order common data object 120a can be defined to include attributes (e.g., orderId, storeName, orderTotal, and the like) that relate to common order data collected by multiple (e.g., many, if not all) electronic commerce systems.

Each of the common data objects 120 may be independent of the electronic commerce system 102, and may be defined to store data corresponding to a determined data type. For example, the order common data object 120a may have a format that is different than the order type format specified by the electronic commerce system 102 and may accommodate multiple, different electronic commerce systems. In some implementations, each of the common data objects 120 may be independent of the analytics system 106. For example, the order common data object 120a may have a format that is different than the order type format specified by the analytics system 106 and may accommodate multiple, different analytics systems.

Based on an identification of one or more common data objects 120, data collected by the electronic commerce system 102 may be stored in one or more instances of the common data object(s) 120. In some implementations, storing data can include mapping attributes of the format specific to the electronic commerce system 102 to attributes of the common data object 120. For example, upon receiving and identifying order-related data, the data collection framework 104 can instantiate the order common data object 120a, and can provide order-related data to the object 120a by accessing attributes of the order-related data and mapping the attributes to corresponding attributes of the order common data object 120a. In some implementations, the common data object(s) 120 can be stored by a persistent storage device (e.g., a database). In some implementations, the common data object(s) 120 may be maintained in memory.

After storing the data collected by the electronic commerce system 102 in one or more instances of the common data object(s) 120, the instance(s) may be provided to the analytics system 106. Upon receiving the instance(s), for example, the analytics system 106 may be enabled to perform analytics on the data using the common format that is different than the format specific to the electronic commerce system 102 and that accommodates multiple, different types of electronic commerce systems. For example, the analytics system 106 can receive data related to the order common data object 120a and can use the data to analyze order-related aspects of the electronic commerce system 102, such as order transactions of one or more website customers.

In some implementations, values for instances of the multiple types of common data objects 120 can be provided to the analytics system 106 to enable the system 106 to perform analytics on the instances without requiring a change of data collection logic used by the electronic commerce system 102. For example, the data collection business logic 110 may be configured to collect and provide data related to orders, catalogs, pricing, marketing, membership, trading, and the like. If the analytics system 106 is configured to perform analytics related to any of these types of data, for example, the data can be provided by the data collection framework 104 via one or more instances of the common data objects 120 without modifying the data collection business logic 110.

In some implementations, the analytics system 106 can be controlled to generate a report based on data provided using the common data objects 120. For example, the analytics system 106 may include a report generator 130 for creating one or more reports for presentation to users of the analytics system 106. Based on values for one or more instances of the order common data object 120a, for example, the analytics system 106 may perform order-related analytics and the report generator 130 may create a report for presenting such analytics.

Figure 2:
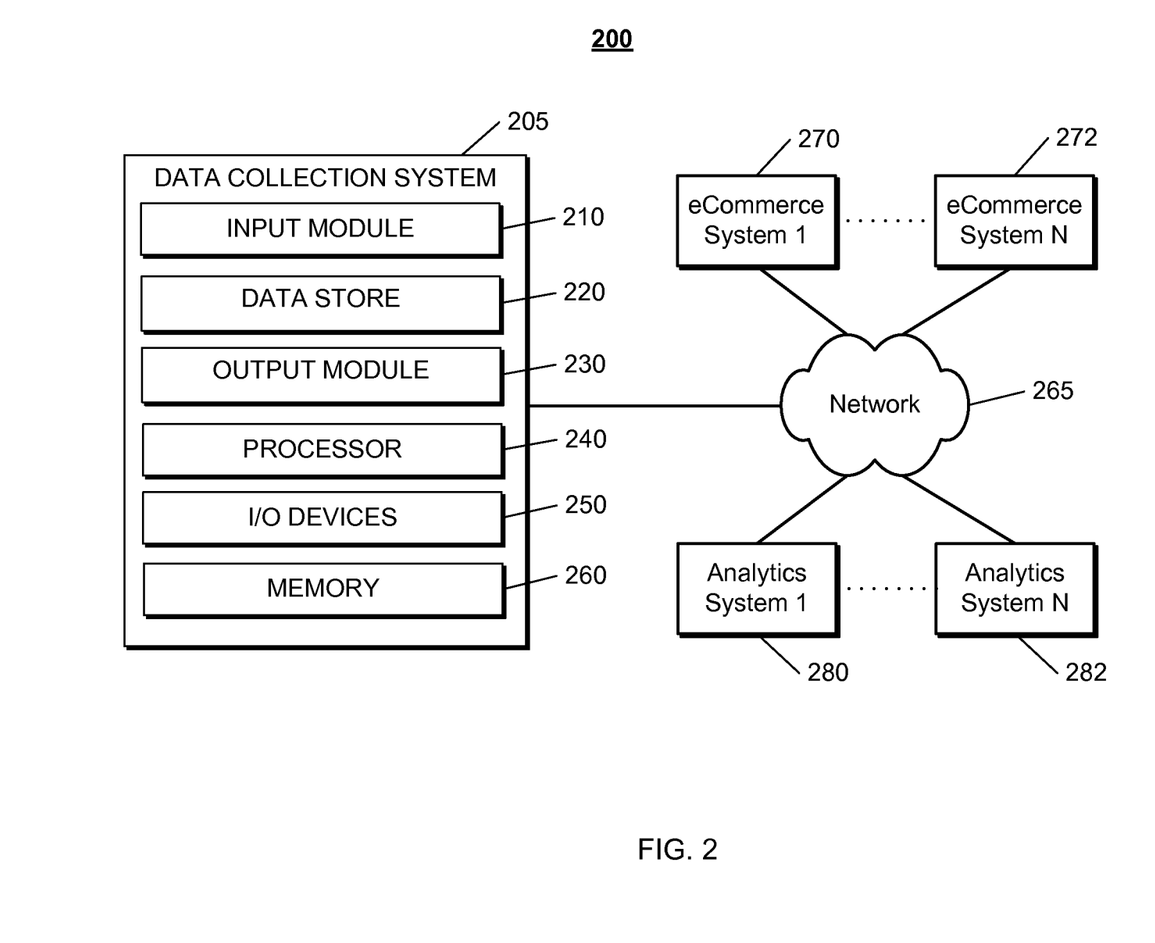

FIG. 2 illustrates an exemplary system 200 for collecting data from electronic commerce systems and for providing collected data to analytics systems. The system 200 includes a data collection system 205, electronic commerce systems 270, 272, and analytics systems 280, 282, connected by a network 265. The network 265 may include one or more public or private, wired or wireless networks, such as the Internet. For example, the various systems 205, 270, 272, 280, 282 included in the system 200 may be configured to communicate with each other using one or more network protocols, such as FTP (File Transfer Protocol), HTTP (Hypertext Transfer Protocol), SOAP (Simple Object Access Protocol), or the like.

In some implementations, the data collection system 205 may be used to implement the data collection framework 104 (shown in FIG. 1). For example, the data collection system 205 may be configured to access data collected by each of the electronic commerce systems 270, 272 and may be configured to provide such data to each of the analytics systems 280, 282. In the present example, the data collection system 205 includes one or more input modules 210, one or more data stores 220, one or more output modules 230, one or more processors 240, one or more I/O (Input/Output) devices 250, and memory 260.

The input module 210 may be used to receive any sort of information from the electronic commerce systems 270, 272. In some implementations, the input module 210 may be configured to receive data collected by data collection business logic associated with any of the electronic commerce systems 270, 272. For example, the input module 210 may receive data related to orders, catalogs, pricing, marketing, members, trading, and the like. In some implementations, the data may relate to building blocks of the electronic commerce systems 270, 272.

In some implementations, data from the input module 210 is stored in the data store 220. The data stored in the data store 220 may be associated with one or more common data objects independent of the electronic commerce systems 270, 272, and independent of the analytics systems 280, 282. For example, the electronic commerce system 270 and the electronic commerce system 272 may each include building blocks for managing order-related data, and each may define a different format for such order-related data. In some implementations, the data store 220 may be used to store the common data objects 120 (shown in FIG. 1) that relate to building blocks that represent building blocks of multiple different types of electronic commerce systems. For example, the data store 220 can store an order-related common data object 120*a* (also shown in FIG. 1) for representing order-related building blocks included in the electronic commerce system 270 and order-related building blocks included in the electronic commerce system 272. In some implementations, common data objects may include attributes that relate to building blocks that are common to multiple different types of electronic commerce systems. For example, the order-related common data object 120*a* can include an orderId attribute that relates to a first order identification attribute used in the electronic commerce system 270 and to a second order identification attribute used in the electronic commerce system 272.

In some implementations, the data store 220 may include relational databases that logically organize data into a series of database tables. For example, each database table in the data store 220 may arrange data in a series of columns (where each column represents an attribute of the data stored in the database) and rows (where each row represents attribute values).

In some implementations, the data store 220 may include one or more object-oriented databases that logically or physically organize data into a series of objects. Each object may be associated with a series of attribute values, for example.

In some implementations, the data store 220 may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular object or process may be retrieved from the data store 220.

The output module 230 may be used to provide instances of the common data objects 120 (shown in FIG. 1) or other related values stored by the data store 220 to one or more of the analytics systems 280, 282. In some cases, instances of the common data objects 120 may initially be provided to a particular analytics system, and may be subsequently provided to a different analytics system. For example, an electronic commerce website owner may elect to change between different analytics vendors. In some implementations, the instances of the multiple types of common data objects 120 can be provided to a new analytics system to enable the new analytics system to perform analytics on the instances without requiring changing code used by an electronic commerce system to collect data. As an example, the data collection system 205 may initially receive order-related data from the electronic commerce system 270, store the data in an order-related common data object, and provide an instance of the object to the analytics system 280. Subsequently, for example, the data collection system 205 may provide an instance of the order-related common data object to the analytics system 282, without changing code used by the electronic commerce system 270.

In another example, the data collection system 205 may receive first order-related data from the electronic commerce system 270, store the first order-related data in a first instance of an order-related common data object, and provide the first instance to the analytics system 280 for analysis. Subsequently, the data collection system 205 may receive second order-related data from the electronic commerce system 272 (e.g., in a different format from the electronic commerce system 270), store the second order-related data in a second instance of the order-related common data object, and provide the second instance to the analytics system 280, which enables the analytics system 280 to perform analysis on the second instance using the same code used to analyze the first instance. The analytics system 280 may treat the first and second instances as data for a single source and, as such, may be able to easily analyze the data together using the same processes.

The processor 240 may be a processor such as a general or special purpose microprocessor suitable for the execution of a computer program. In some implementations, the data collection system 205 includes more than one processor 240. The processor 240 may receive instructions and data from the memory 260. For example, the memory 260 may store instructions and data corresponding to any or all of the components of the data collection system 205. The memory 260 may include read-only memory, random-access memory, or both, for example.

The I/O devices 250 may be configured to provide input to and output from the data collection system 205. For example, the I/O devices 250 may include a mouse, a keyboard, a stylus, or any other device that allows the input of data. The I/O devices 250 may also include a display, a printer, or any other device that outputs data.

Figure 3:
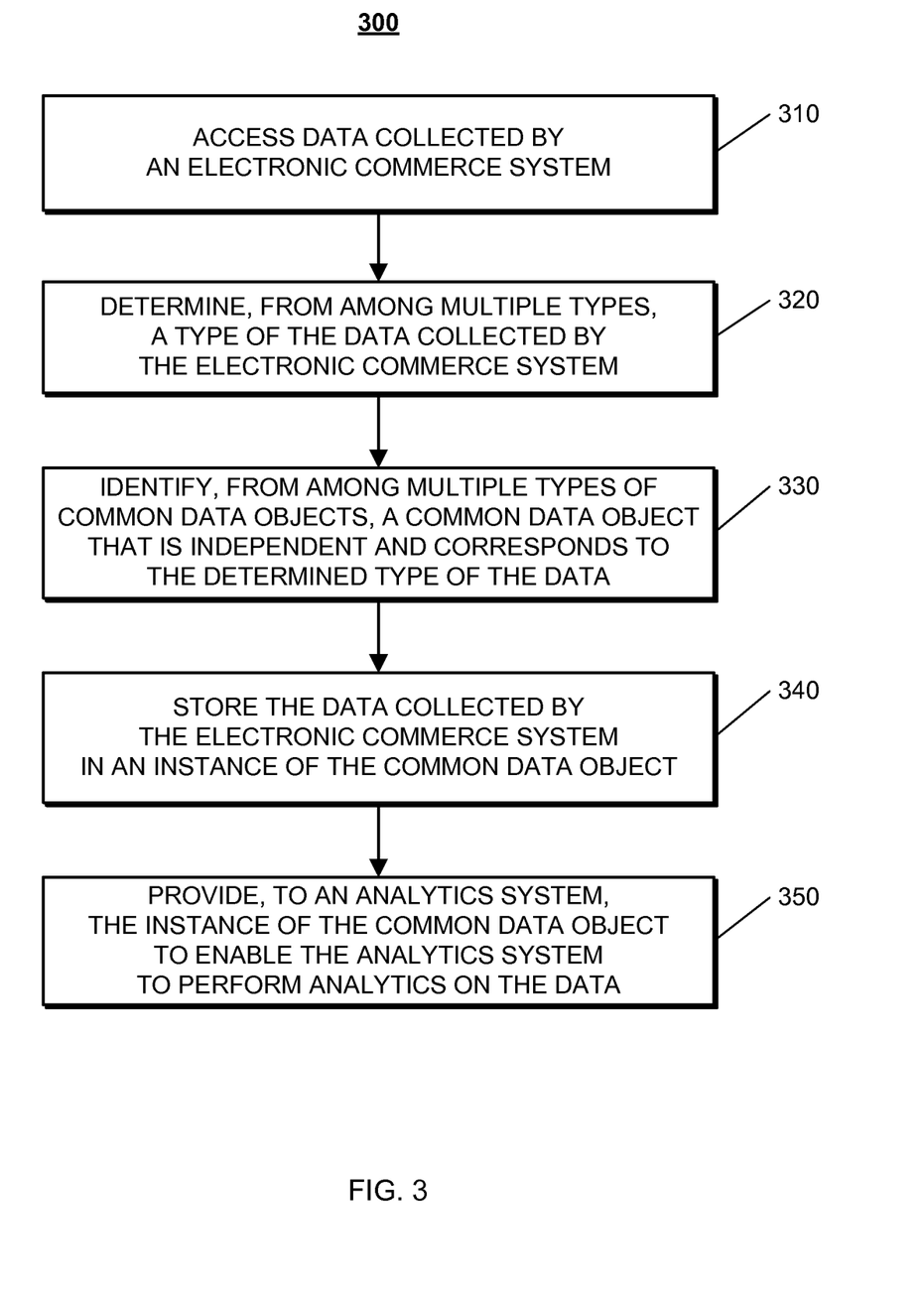
FIG. 3 is a flowchart of an exemplary process.

FIG. 3 illustrates an exemplary process 300 for accessing data collected by an electronic commerce system and providing a common data object based on the data to an analytics system. The operations of the process are described generally as being performed by the system 100. The operations of the process 300 may be performed by one of the components of the system 100 (e.g., the data collection framework 104) or may be performed by a combination of the components of the system 100. In some implementations, operations of the process 300 may be performed by another system, such as the system 200. In some implementations, operations of the process 300 may be performed by one or more processors included in one or more electronic devices.

The data collection framework 104 accesses data collected by an electronic commerce system (310). For example, the data collection framework 104 can receive data collected by the data collection business logic 110 from the electronic commerce system 102. Such data can be related to orders, catalogs, pricing, marketing, members, and/or trading, to list a few examples. In some implementations, the data may be arranged in a format specific to the electronic commerce system 102. Order-related data may be related to one or more order-related building blocks included in the electronic commerce system 102, for example.

In response to accessing the data collected by the electronic commerce system 102, the data collection framework 104 determines, from among multiple types of data collected by electronic commerce systems, a type of data collected by the electronic commerce system (320). For example, the data collection framework 104 may determine that accessed data provided by the electronic commerce system 102 are related to orders (or any of the other types of data described throughout this disclosure).

Based on the determination of the type of data collected by the electronic commerce system 102, the data collection framework 104 identifies, from among multiple types of common data objects 120 that are defined to store data corresponding to the multiple types of data collected by electronic commerce systems, a common data object that is independent of the electronic commerce system 102 and that is defined to store data corresponding to the determined type of data collected by the electronic commerce system (330). For example, the data collection framework 104 may identify the order common data object 120a to store order-related data, the catalog common data object 120b to store catalog-related data, the pricing common data object 120c to store pricing-related data, the marketing common data object 120d to store marketing-related data, the member common data object 120e to store member-related data, and the trading common data object 120f to store trading-related data. In some implementations, each of the common data objects 120 may have a common format that is different than the format specific to the electronic commerce system 102 and that accommodates multiple, different types of electronic commerce systems. For example, attributes of order-related data formats from various electronic commerce systems may be mapped to the order common data object 120a.

Based on the identification of the common data object, data collected by the electronic commerce system 102 is stored in an instance of the common data object (340). For example, the data collection framework 104 can create an instance of the order common data object 120a, and store order-related data in the instance.

After storing the data collected by the electronic commerce system 102 in the instance of the common data object, the instance of the common data object can be provided to the analytics system 106 to enable the system 106 to perform analytics on the data (350). For example, the analytics system 106 can use the format of the common data object 120 that is different than the format specific to the electronic commerce system 102, and that accommodates multiple different types of electronic commerce systems. Using the common format may be beneficial to the analytics system 106 because the analytics system 106 may be able to use the same (or similar) analytics code to perform analysis on data collected by different electronic commerce systems. For instance, the same analytics code may be used when a company changes from using a first electronic commerce system to a second, different electronic commerce system and data collected by both systems may be analyzed together in a seamless manner.

Figure 4:
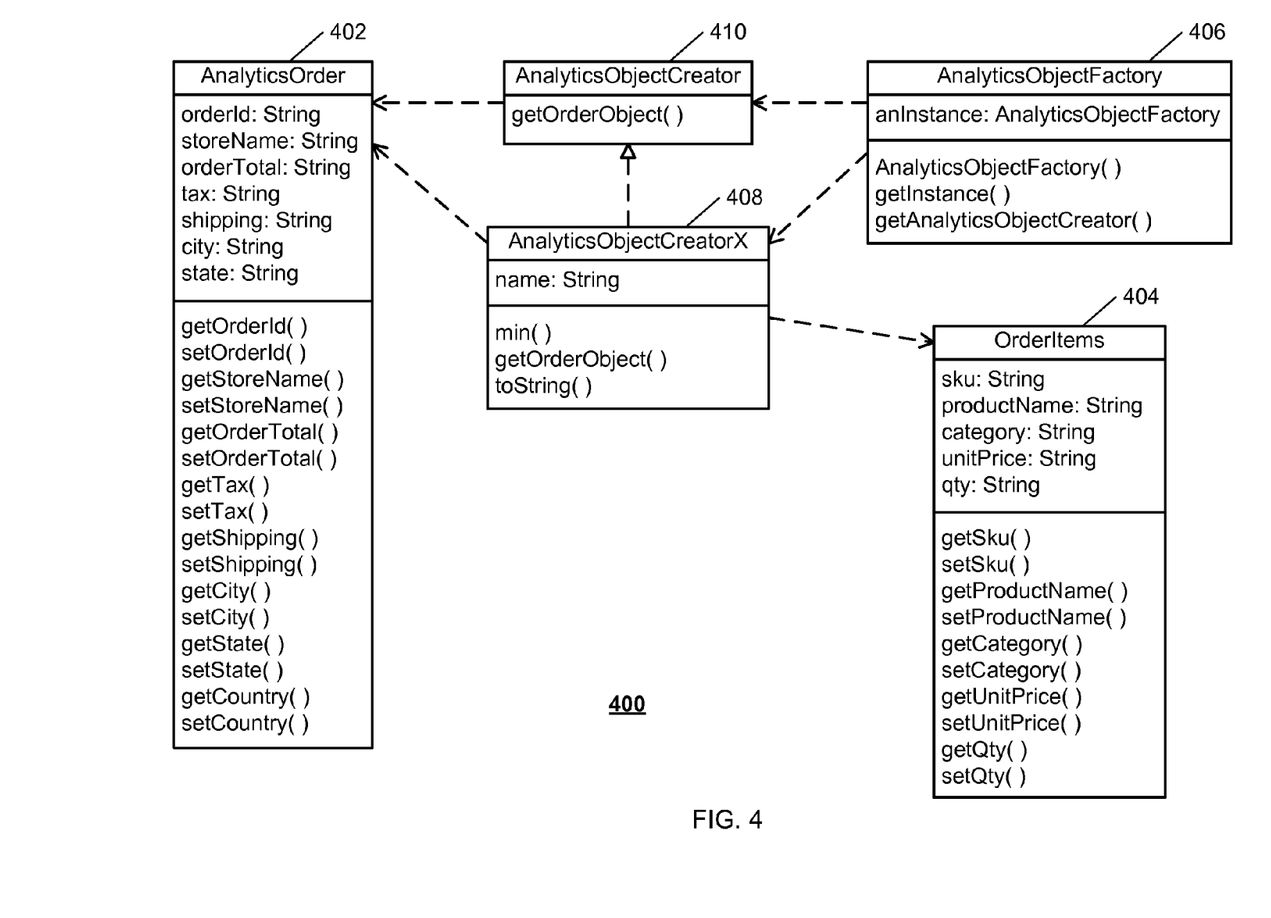
FIG. 4 is a diagram of an exemplary object model.
Like reference numbers represent corresponding parts throughout.

FIG. 4 illustrates an exemplary object model 400 for a common data object. In some implementations, each of the common data objects 120 (shown in FIG. 1) may be based on object models including one or more application code classes. For example, the object model 400 can be used to implement the order common data object 120a. In general, object models may be implemented using one or more object-oriented computer programming languages (e.g., C++, Java, and the like). Classes included in the object models may include various attributes and methods for storing and accessing object data, for example.

The object model 400 may include an analytics order class 402, an order items class 404, an analytics object factory class 406, a system-specific analytics object creator class 408, and a generic analytics object creator class 410. In some implementations, the analytics order class 402 may be part of the data collection framework 104 (shown in FIG. 1). For example, objects based on the analytics order class 402 can be used to store order-related data. Similarly, in some implementations, the order items class 404 may be part of the data collection framework 104. For example, the order items class 404 can be used to create order item objects associated with orders. In some implementations, object instances based on the analytics order class 402 and the order item class 404 may be represented by the order common data object 120a (shown in FIG. 1). For example, the order common data object 120a may include an AnalyticsOrder object and one or more OrderItems objects associated with the AnalyticsOrder.

In some implementations, the analytics object factory class 406 may implement a singleton design pattern and may be used as a factory method to create analytics objects. For example, the system-specific analytics object creator class 408 can be used by the electronic commerce system 102 to retrieve order-related data. In some implementations, the system-specific analytics object creator class 408 may implement an interface of the generic analytics object creator class 410. For example, the generic analytics object creator class 410 may provide a generic interface to the system-specific analytics object creator class 408.

Figure 5:
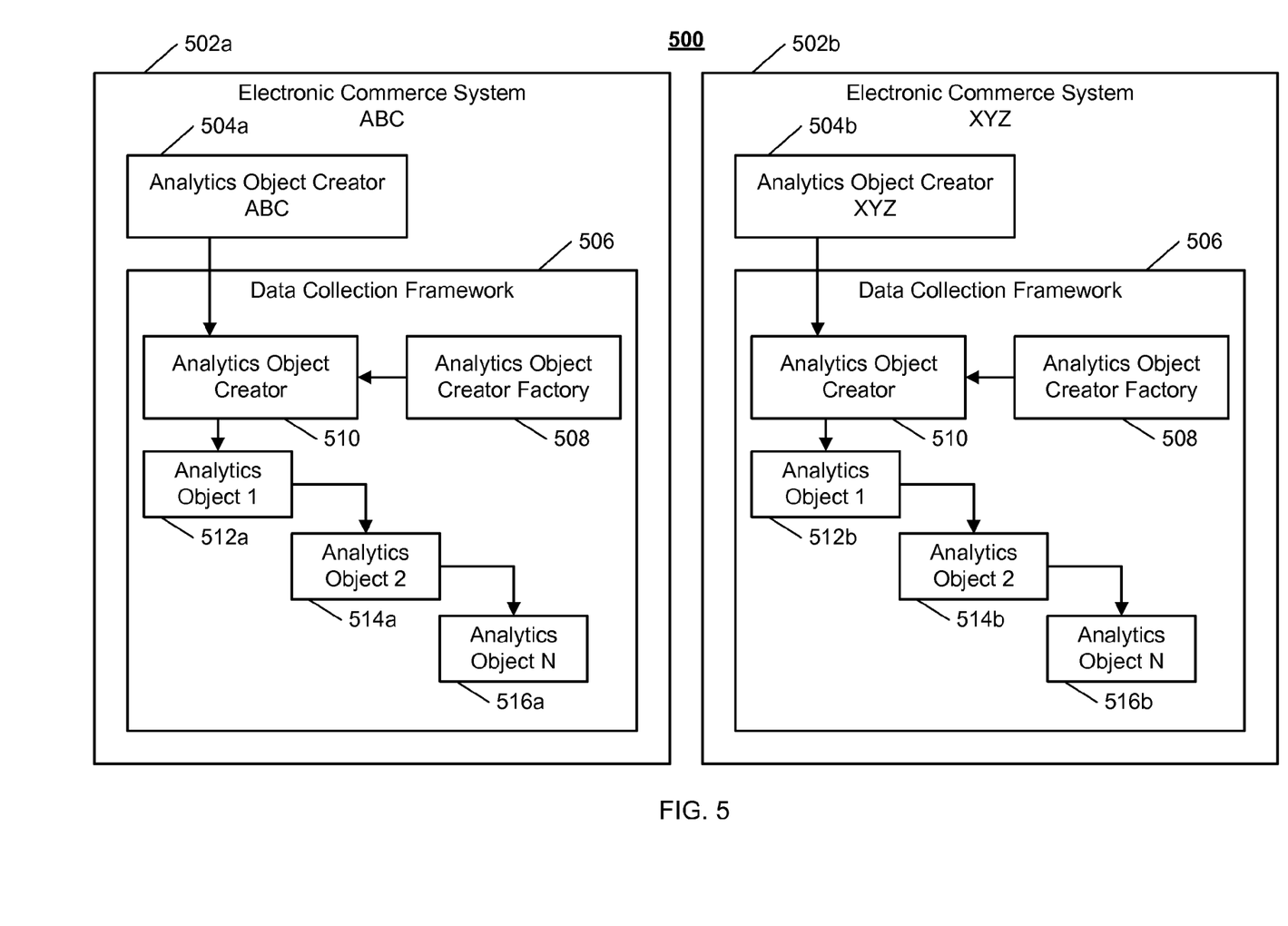

FIG. 5 illustrates an exemplary system 500 for creating analytics objects. In general, analytics objects may be instances of analytics classes, and may be used by one or more analytics systems (e.g., the analytics system 106, shown in FIG. 1) to analyze data collected by one or more electronic commerce systems (e.g., the electronic commerce system 102, also shown in FIG. 1). The system 500 in the present example includes electronic commerce system 502a and electronic commerce system 502b. For example, the electronic commerce systems 502a, 502b may be maintained by different entities, and may use different data formats for defining collected data.

In some implementations, each electronic commerce system 502 may include a class specific to the particular system or platform used for creating generic analytics objects. For example, the electronic commerce system 502a may include a system-specific analytics object creator 504a configured to create generic analytics objects related to data collected by the system 502a. Similarly, for example, the electronic commerce system 502b may include a system-specific analytics object creator 504b configured to create generic analytics objects related to data collected by the system 502b.

In some implementations, a generic analytics object creator may be used to provide a generic interface which has methods to create generic analytics objects for one or more analytics events. For example, the data collection framework 506 included in or in communication with each of the electronic commerce systems 502a, 502b, can include an analytics object creator 510. The analytics object creator 510 may provide a generic interface to the system-specific analytics object creators 504a, 504b, for example, for creating generic analytics objects for analytics events such as page views, product views, orders, registrations, and the like.

In some implementations, an analytics object factory class can be used to create common data objects for an electronic commerce system. For example, the data collection framework 506 included in or controlled by each of the electronic commerce systems 502a, 502b, can include an analytics object creator factory 508. The analytics object creator factory 508 may be used to create multiple types of common data objects (e.g., the common data objects 120, shown in FIG. 1) for storing data collected by various electronic commerce systems. For example, the electronic commerce system 502a may use the analytics object creator factory 508 to create one or more common data objects for storing data collected by the system 502a. Similarly, the electronic commerce system 502b may use the analytics object creator factory 508 to create one or more common data objects for storing data collected by the system 502b.

In some implementations, the analytics object creator factory class 508 may be used to provide a system-specific object creator class for a particular electronic commerce system. For example, upon receiving user input (e.g., a type parameter) associated with the electronic commerce system 502a, the analytics object creator factory 508 may be used to provide the electronic commerce system 502a with an instance of the analytics object creator 504a. Similarly, the analytics object creator factory 508 may be used to provide the electronic commerce system 502b with an instance of the analytics object creator 504b.

In some implementations, multiple types of common data objects may be defined to represent a set of analytics object classes. For example, the electronic commerce system 502a can use the system-specific analytics object creator 504a (e.g., via a generic interface provided by the analytics object creator 510) and may use data associated with one or more of the common data objects 120 (shown in FIG. 1) to create analytics objects 512a, 514a, and 516a. Similarly, the electronic commerce system 502b can use the system-specific analytics object creator 504b to create analytics objects 512b, 514b, and 516b. The analytics objects 512, 514, and 516 may represent instances of analytics page view classes, analytics product view classes, analytics order classes, analytics registration classes, and the like, and may be provided to one or more analytics systems.

Figure 6:
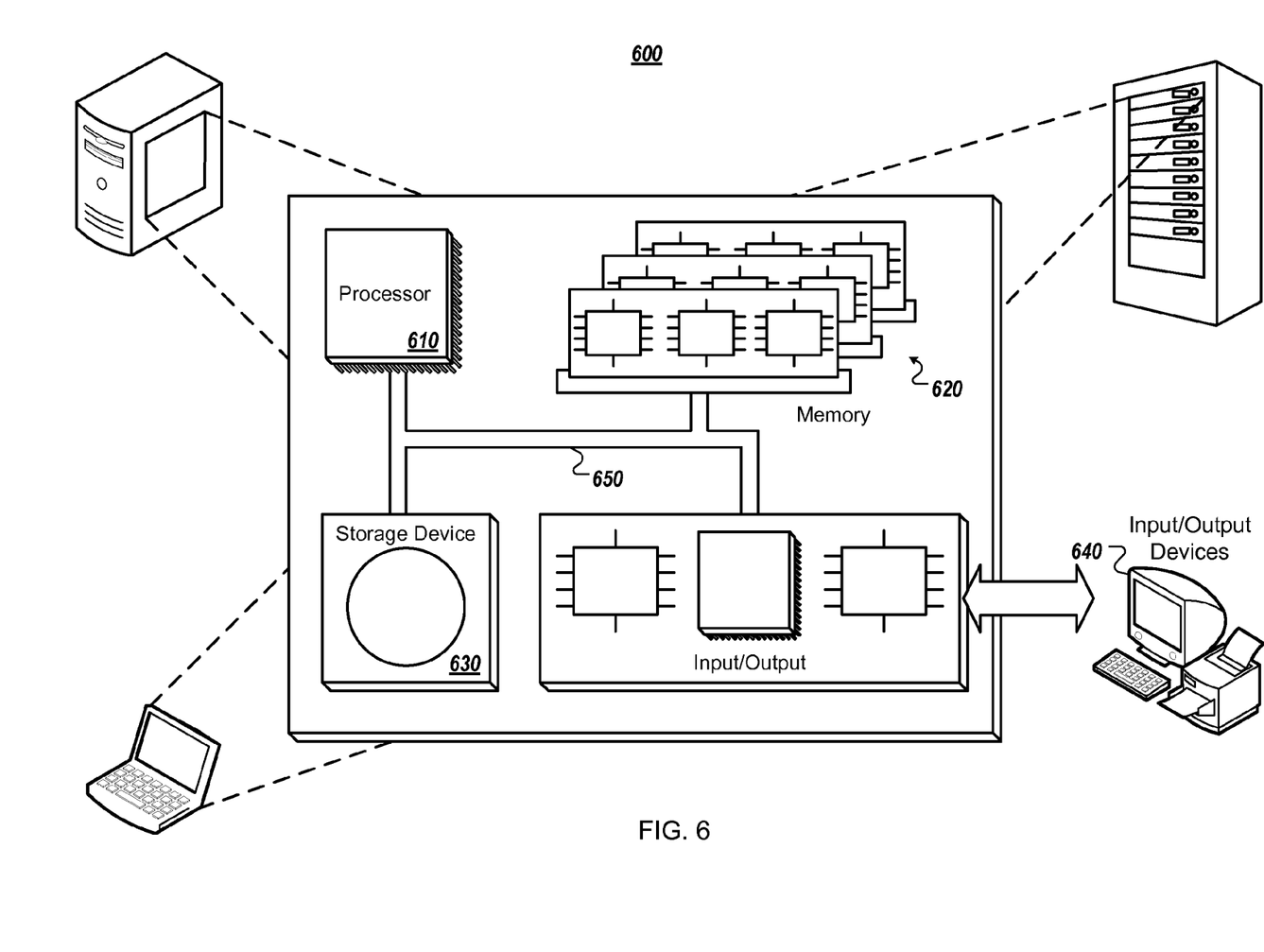

FIG. 6 is a schematic diagram of an example of a computer system 600. The system 600 can be used for the operations described in association with the process 300, according to one implementation. For example, the system 600 may be included in any or all of the systems 100, 200, and 500.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or instructions stored on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer system comprising:
at least one processor; and
at least one memory coupled to the at least one processor having stored thereon instructions which, when executed by the at least one processor, causes the at least one processor to perform operations comprising:

accessing, for a first electronic commerce system, first data collected by the first electronic commerce system, the first data being arranged in a first format specific to the first electronic commerce system;

in response to accessing the first data collected by the first electronic commerce system, determining, from among multiple types of data collected by electronic commerce systems, a type of the first data collected by the first electronic commerce system;

based on the determination of the type of the first data collected by the first electronic commerce system, identifying, from among multiple types of common data objects that are defined to store data corresponding to the multiple types of data collected by electronic commerce systems, a first common data object that is independent of the first electronic commerce system and that is defined to store data corresponding to the determined type of the first data collected by the first electronic commerce system, the first common data object having a common format that is (i) different than the first format specific to the first electronic commerce system and that accommodates multiple, different types of electronic commerce systems and (ii) independent of a plurality of analytics systems;

based on the identification of the first common data object, storing the first data collected by the first electronic commerce system in a first instance of the first common data object;

after storing the first data collected by the first electronic commerce system in the first instance of the first common data object, providing, to a first analytics system from among the plurality of analytics systems, the first instance of the first common data object to enable the first analytics system to perform analytics on the first data collected by the first electronic commerce system using the common format that is (i) different than the first format specific to the first electronic commerce system and that accommodates multiple, different types of electronic commerce systems and (ii) independent of the plurality of analytics systems;

accessing, for a second electronic commerce system that is different than the first electronic commerce system, second data collected by the second electronic commerce system, the second data being arranged in a second format specific to the second electronic commerce system;

in response to accessing the second data collected by the second electronic commerce system, determining, from among the multiple types of data collected by electronic commerce systems, a type of the second data collected by the second electronic commerce system;

based on the determination of the type of the second data collected by the second electronic commerce system, identifying, from among the multiple types of common data objects that are defined to store data corresponding to the multiple types of data collected by electronic commerce systems, the first common data object as being appropriate to store the type of the second data collected by the second electronic commerce system, the first common data object having a common format that is different than the second format specific to the second electronic commerce system;

based on the identification of the first common data object as being appropriate to store the type of the second data collected by the second electronic commerce system, storing the second data collected by the second electronic commerce system in a second instance of the first common data object; and after storing the second data collected by the second electronic commerce system in the second instance of the first common data object, providing, to a second analytics system from among the plurality of analytics systems, the second instance of the first common data object to enable the second analytics system to perform analytics on the second data collected by the second electronic commerce system using the common format that is (i) different than the second format specific to the second electronic commerce system and that accommodates multiple, different types of electronic commerce systems and (ii) independent of the plurality of analytics systems, the second analytics system being different than the first analytics system.

2. The computer system of claim 1, wherein the common format of the first common data object accommodates multiple, different analytics systems.

3. The computer system of claim 1, wherein the operations further comprise controlling the first electronic commerce system to collect the first data.

4. The computer system of claim 3, wherein controlling the first electronic commerce system to collect the first data comprises controlling the first electronic commerce system to implement business logic needed to collect data stored by the first common data object.

5. The computer system of claim 1, wherein the operations further comprise controlling the first analytics system to generate a report based on data provided using common data objects.

6. The computer system of claim 1, wherein the operations further comprise defining the first common data object to include attributes that relate to building blocks of the first electronic commerce system and the second electronic commerce system.

7. The computer system of claim 6, wherein defining the first common data object to include attributes that relate to building blocks of the first electronic commerce system and the second electronic commerce system comprises defining the first common data object to include attributes that relate to building blocks that are common to each of the multiple, different types of electronic commerce systems.

8. The computer system of claim 1, wherein the operations further comprise defining the multiple types of common data objects to represent building blocks of the first electronic commerce system and the second electronic commerce system.

9. The computer system of claim 8, wherein defining the multiple types of common data objects to represent building blocks of the first electronic commerce system and the second electronic commerce system comprises defining the multiple types of common data objects to represent building blocks that are common to each of the multiple, different types of electronic commerce systems.

10. The computer system of claim 8, wherein defining the multiple types of common data objects to represent building blocks of the first electronic commerce system and the second electronic commerce system comprises defining a common order data object that stores data associated with orders, a common catalog data object that stores data associated with catalog entries, a common member data object that stores data associated with members, a common marketing data object that stores data associated with marketing items, a common trading data object that stores data associated with trades, and a common pricing data object that stores data associated with pricing.

11. The computer system of claim 1, wherein the operations further comprise providing, to a new analytics system that is different than one of the plurality of analytics systems, instances of some of the multiple types of common data objects to enable the new analytics system to perform analytics on the instances of the some of the multiple types of common data objects without requiring change of code used by any of the plurality of electronic commerce systems to collect data.

12. The computer system of claim 1, wherein the operations further comprise providing, to the first analytics system, values for additional instances of the multiple types of common data objects to enable the first analytics system to perform analytics on the instances of the multiple types of common data objects without requiring change of data collection logic used by the first electronic commerce system or the second electronic commerce system.

13. The computer system of claim 1, wherein storing the first data collected by the first electronic commerce system in the instance of the first common data object comprises mapping attributes of the first format specific to the first electronic commerce system to attributes of the first common data object.

14. The computer system of claim 1, wherein the operations further comprise using an analytics object factory class to create the multiple types of common data objects for the first electronic commerce system.

15. The computer system of claim 14, wherein using the analytics object factory class to create the multiple types of common data objects for the first electronic commerce system comprises receiving user input of a type of the first electronic commerce system and using the analytics object factory class to return an instance of a system specific object creator class for the type of the first electronic commerce system.

16. The computer system of claim 1, wherein the operations further comprise using an analytics object creator to provide a generic interface which has methods to create generic analytics objects for each analytics event.

17. The computer system of claim 1, wherein the operations further comprise creating a class specific to a platform used by the first electronic commerce system to create generic analytics objects.

18. The computer system of claim 1, wherein the operations further comprise defining the multiple types of common data objects to represent a set of analytics object classes that include at least an analytics page view class, an analytics product view class, an analytics order class, and an analytics registration class.

19. A computer-implemented method comprising:
accessing, for a first electronic commerce system, first data collected by the first electronic commerce system, the first data being arranged in a first format specific to the first electronic commerce system;
in response to accessing the first data collected by the first electronic commerce system, determining, from among multiple types of data collected by electronic commerce systems, a type of the first data collected by the first electronic commerce system;
based on the determination of the type of the first data collected by the first electronic commerce system, identifying, from among multiple types of common data objects that are defined to store data corresponding to the multiple types of data collected by electronic commerce systems, a first common data object that is independent of the first electronic commerce system and that is defined to store data corresponding to the determined type of the first data collected by the first electronic commerce system, the first common data object having a common format that is (i) different than the first format specific to the first electronic commerce system and that accommodates multiple, different types of electronic commerce systems and (ii) independent of a plurality of analytics systems;
based on the identification of the first common data object, storing the first data collected by the first electronic commerce system in a first instance of the first common data object;
after storing the corresponding data collected by the corresponding electronic commerce system after storing the first data collected by the first electronic commerce system in the first instance of the first common data object, providing, to a first analytics system from among the plurality of analytics systems, the first instance of the first common data object to enable the first analytics system to perform analytics on the first data collected by the first electronic commerce system using the common format that is (i) different than the first format specific to the first electronic commerce system and that accommodates multiple, different types of electronic commerce systems and (ii) independent of the plurality of analytics systems;
accessing, for a second electronic commerce system that is different than the first electronic commerce system, second data collected by the second electronic commerce system, the second data being arranged in a second format specific to the second electronic commerce system;
in response to accessing the second data collected by the second electronic commerce system, determining, from among the multiple types of data collected by electronic commerce systems, a type of the second data collected by the second electronic commerce system;
based on the determination of the type of the second data collected by the second electronic commerce system, identifying, from among the multiple types of common data objects that are defined to store data corresponding to the multiple types of data collected by electronic commerce systems, the first common data object as being appropriate to store the type of the second data collected by the second electronic commerce system, the first common data object having a common format that is different than the second format specific to the second electronic commerce system;
based on the identification of the first common data object as being appropriate to store the type of the second data collected by the second electronic commerce system, storing the second data collected by the second electronic commerce system in a second instance of the first common data object; and
after storing the second data collected by the second electronic commerce system in the second instance of the first common data object, providing, to a second analytics system from among the plurality of analytics systems, the second instance of the first common data object to enable the second analytics system to perform analytics on the second data collected by the second electronic commerce system using the common format that is (i) different than the second format specific to the second electronic commerce system and that accommodates multiple, different types of electronic commerce systems and (ii) independent of the plurality of analytics systems, the second analytics system being different than the first analytics system.

20. At least one non-transitory computer-readable storage medium encoded with executable instructions that, when executed by at least one processor, cause the at least one processor to perform operations comprising:

accessing, for a first electronic commerce system, first data collected by the first electronic commerce system, the first data being arranged in a first format specific to the first electronic commerce system;

in response to accessing the first data collected by the first electronic commerce system, determining, from among multiple types of data collected by electronic commerce systems, a type of the first data collected by the first electronic commerce system;

based on the determination of the type of the first data collected by the first electronic commerce system, identifying, from among multiple types of common data objects that are defined to store data corresponding to the multiple types of data collected by electronic commerce systems, a first common data object that is independent of the first electronic commerce system and that is defined to store data corresponding to the determined type of the first data collected by the first electronic commerce system, the first common data object having a common format that is (i) different than the first format specific to the first electronic commerce system and that accommodates multiple, different types of electronic commerce systems and (ii) independent of a plurality of analytics systems;

based on the identification of the first common data object, storing the first data collected by the first electronic commerce system in a first instance of the first common data object;

after storing the first data collected by the first electronic commerce system in the first instance of the first common data object, providing, to a first analytics system from among the plurality of analytics systems, the first instance of the first common data object to enable the first analytics system to perform analytics on the first data collected by the first electronic commerce system using the common format that is (i) different than the first format specific to the first electronic commerce system and that accommodates multiple, different types of electronic commerce systems and (ii) independent of the plurality of analytics systems;

accessing, for a second electronic commerce system that is different than the first electronic commerce system, second data collected by the second electronic commerce system, the second data being arranged in a second format specific to the second electronic commerce system;

in response to accessing the second data collected by the second electronic commerce system, determining, from among the multiple types of data collected by electronic commerce systems, a type of the second data collected by the second electronic commerce system;

based on the determination of the type of the second data collected by the second electronic commerce system, identifying, from among the multiple types of common data objects that are defined to store data corresponding to the multiple types of data collected by electronic commerce systems, the first common data object as being appropriate to store the type of the second data collected by the second electronic commerce system, the first common data object having a common format that is different than the second format specific to the second electronic commerce system;

based on the identification of the first common data object as being appropriate to store the type of the second data collected by the second electronic commerce system, storing the second data collected by the second electronic commerce system in a second instance of the first common data object; and after storing the second data collected by the second electronic commerce system in the second instance of the first common data object, providing, to a second analytics system from among the plurality of analytics systems, the second instance of the first common data object to enable the second analytics system to perform analytics on the second data collected by the second electronic commerce system using the common format that is (i) different than the second format specific to the second electronic commerce system and that accommodates multiple, different types of electronic commerce systems and (ii) independent of the plurality of analytics systems, the second analytics system being different than the first analytics system.

* * * * *